No. 879,880. PATENTED FEB. 25, 1908.
D. LANDAU.
PIPE COUPLING.
APPLICATION FILED MAR. 15, 1907.
2 SHEETS—SHEET 2.
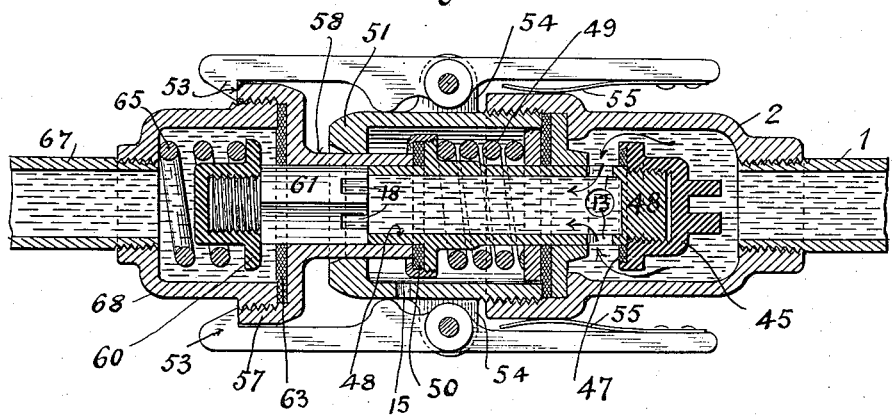
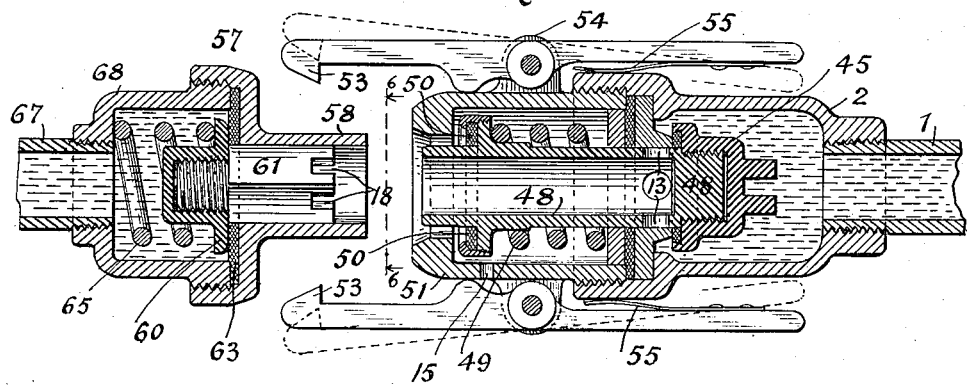
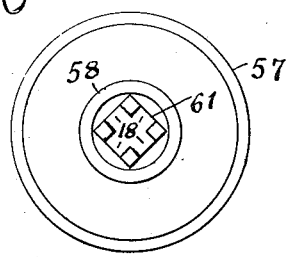

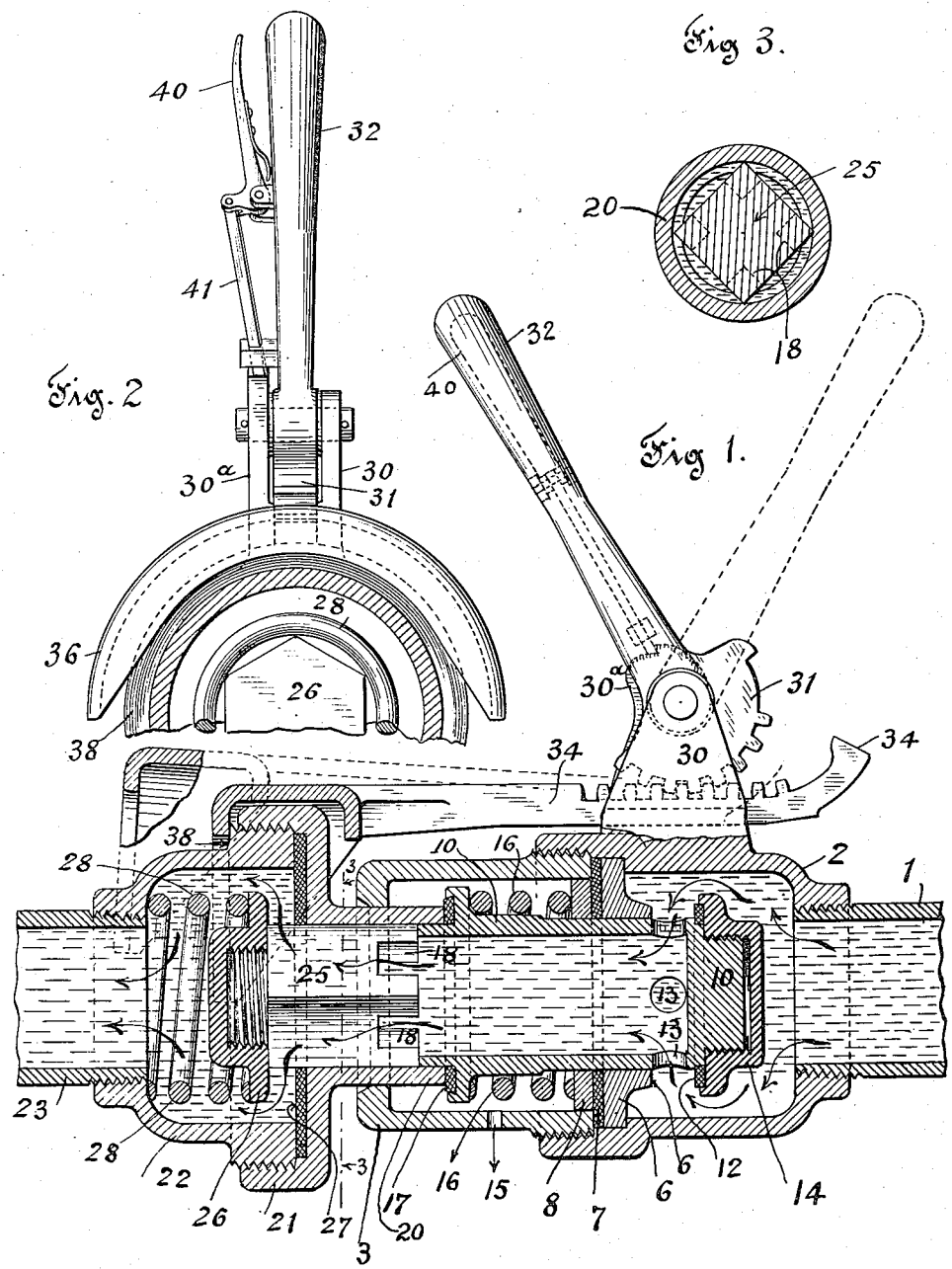

UNITED STATES PATENT OFFICE.

DEWIS LANDAU, OF SAN FRANCISCO, CALIFORNIA.

PIPE-COUPLING.

No. 879,880.  Specification of Letters Patent.  Patented Feb. 25, 1908.

Application filed March 15, 1907. Serial No. 362,447.

*To all whom it may concern:*

Be it known that I, DEWIS LANDAU, a citizen of the United States of America, and a resident of the city and county of San Francisco, State of California, have invented certain new and useful Improvements in Pipe-Couplings, of which the following is a specification.

This invention relates to improvements in pipe couplings.

The invention is an improvement upon the device set forth in my United States Letters Patent No. 813,437, dated February 27, 1906, and the special purpose of this invention is to furnish a coupling provided with valves so arranged that the junction of the parts of the coupling automatically opens the valves, and that the separation of the parts of the coupling automatically closes or allows the valves to close.

The invention is adapted to use with receptacles for water, steam, and other fluids and liquids of all kinds as well as pipes and other conduits for liquids.

The invention also includes means for locking the members of the coupling firmly together when joined and for readily unlocking and allowing the separation of the parts of the coupling, and an important feature of the invention is a hollow valve or valves, as will be hereinafter described and explained.

Referring to the drawings which accompany the specification to aid the description, Figure 1 is a longitudinal section, partly broken, of the parts of the coupling joined and shown in their fully closed position. Fig. 2 is an end elevation partly sectioned and broken, and showing the same parts as are shown in Fig. 1. Fig. 3 is a section on the lines 3—3 of Fig. 1. Fig. 4 is a longitudinal section, with certain parts in elevation, of a modification of the device for locking the parts of the coupling together, and showing the part of the coupling fully home to place and the valves open. Fig. 5 is a view of the same parts, but with the members of the coupling separated and the valves closed, and Fig. 6 is an end view on the line 6—6 of Fig. 5.

Referring to Figs. 1, 2 and 3, the pipe 1 on the inlet side of the coupling has a hub 2 provided with a nozzle 3, in the end of which is an opening to admit the other member of the coupling as will be hereinafter explained. The said hub 2 is provided with a valve seat 6 made tight by the packing ring 7 and washer 8, and through said valve seat, packing and washer works the hollow stem 10 provided with a valve consisting of a soft disk of rubber, leather or other suitable material 12, positioned between a flange on said stem 10 and the screw cap 14, which is threaded on to the solid end of said stem, 13 being holes in said stem to provide for the admission of the liquid. A spring 16 normally holds said valve closed against the aforesaid valve seat. The other end of said stem 10 is provided with a disk of rubber, leather, or other similar material 17, adapted to make a tight fit with the end of the tube 20 which forms a part of the other member of the coupling, and said tube 20 is provided with the hub 21 into which threads the hub 22 connected with the pipe 23 which leads into a siphon or other vessel, or is connected with any other pipe, tube or conduit into which or through which the liquid is to be discharged, according to the use to which the coupling is to be put. A valve 26 is threaded on the rectangular guide 25, which is provided with parts 18 and works in the said tube 20, and said valve 26 seats on a ring or washer 27, of rubber, leather or suitable material, positioned between said hubs 21 and 22. Said valve 26 is held normally closed by the spring 28.

Mounted on said hub 2 are the standards 30 in which is pivoted the tooth segment 31 operated by the handle 32, and said segment 31 meshes with a rack bar 34, which is guided between said standards 30 and is provided at its end with the annular flanged hook 36 adapted to engage over a shoulder 38 of said hub 22. The rear end of said bar 34 is curved as indicated, for the purpose of causing the said hook 36 to rise up out of engagement with said flange 38 when in the position for releasing the members of the coupling. A spring operated thumb lever 40 pivoted on said handle 32 actuates a catch 41 which engages a notch or notches on one of said standards, 30ª, for the purpose of locking said handle 32 in certain positions.

The parts operate in the following manner: When the members of the coupling are separated the aforesaid springs 16 and 28 will cause their respective valves to close. To connect the two members of the coupling the tube 20 is inserted through the opening of the nozzle 3 until it comes into contact with the disk 17 carried by the aforesaid valve stem 10. Further pushing of said tube 20 into said nozzle 3 forces the valve 12 off its seat 6, and of course also forces the valve 26 off its seat, thereby opening the valves in both members of the coupling automatically and simultaneously. At this time the hook 36 is in the position indicated by the dotted and broken solid lines of Fig. 1. The operator now taking hold of the handle 32 and drawing it to the left of Fig. 1, the corresponding rotation of the segment 31 slides the bar 34 to the right, and thereby both draws down the hook and brings it tight against the flange 38, whereby the parts of the coupling are held firmly together, and the engagement of the stop 41 with the notch on the aforesaid standard 30 locks the parts securely in this position. To release the members of the coupling the operator, taking hold of lever 32 and withdrawing the stop 41 out of the aforesaid notch on one of the standards 30, throws said handle 32 to the right to the position indicated by the dotted line in Fig. 1, and thereby shifts said bar 34 to the left and lifts the flange hook 36 out of the way of said flange 38, and now the parts of the coupling can be separated, the aforesaid valves 12 and 26 being automatically closed by their respective springs as the parts of the coupling are separated.

Referring to Fig. 1, it will be seen that the result of the tube 20 entering the nozzle 3 and engaging the disk 17 on the outside of the tubular valve stem 10 is, that said tube 20 will make a liquid-tight joint with said disk 17 until after said valves 6 and 26 are closed when disconnecting the members of the coupling, and that said tube 20 will make a liquid-tight joint with said disk 17 before said valves 6 and 26 begin to open when connecting the members of the couplings, and therefore this construction prevents leakage, and a similar construction is seen in Fig. 4.

Referring to Figs. 4, 5 and 6, the valve 47 with its screw cap 45 and tubular stem 48, spring 49, washer 50, and nozzle 51, are arranged substantially similar to corresponding parts in Fig. 1, but there are now two hooks 53 pivoted in standards 54 on said nozzle 51, and provided with springs 55 which normally tend to hold said hooks in the position of engaging the end of the hub 57 on the other part of the coupling. The tube 58 of said hub 57 is adapted to enter the end of said nozzle 51 and effect the opening of the two parts of the coupling in the manner heretofore described, and in said tube 58 works the square stem 61 of the valve 60 which is normally pressed home to its seat 63 by its spring 65, 67 being a pipe leading to a siphon or other vessel, or being connected with a pipe or conduit or other receptacle into which liquid is to be delivered.

It will be manifest that when the two parts of the coupling are brought together the beveled ends of said hooks 53 will snap over the preferably beveled ends of the hub 57, and will thereby hold the parts of the coupling in their closed position, the two valves being at the same time open. To release the parts of the coupling, the operator draws the right end of said hooks 53 together, thereby opening the hooks, when the parts of the coupling may be separated. As the parts of the coupling become separated the aforesaid springs 49 and 65 close their respective valves.

It will be evident that all forms of the coupling will operate equally well whichever end is connected with the supply and whichever direction the liquid flows.

Now, having described my improvements I claim as my invention.

The combination in a coupling, of one member provided with a valve seat, a tubular valve in said member adapted to normally close on said seat, a second member of said coupling provided with a valve seat and with a tubular extension adapted to enter the end of said first named member and engage said tubular valve, and a valve in said second member adapted to normally close on said last named valve seat and having a stem adapted to engage said tubular valve, a hook for holding said members in closed position, and a rack and pinion for operating said hook, substantially as described.

Signed at New York city this 12th day of March 1907.

DEWIS LANDAU.

Witnesses:
D. WALTER BROWN,
WALTER N. HARRIS.